(12) United States Patent
Boyce et al.

(10) Patent No.: US 7,530,542 B2
(45) Date of Patent: May 12, 2009

(54) LOCKING MOUNTING ASSEMBLY

(75) Inventors: Dean Arden Boyce, Waterloo, IA (US); Randall Craig Machnoiz, Denver, IA (US)

(73) Assignee: Deere & Company, Moline, IL (US)

( * ) Notice: Subject to any disclaimer, the term of this patent is extended or adjusted under 35 U.S.C. 154(b) by 194 days.

(21) Appl. No.: 11/635,313

(22) Filed: Dec. 7, 2006

(65) Prior Publication Data

US 2008/0135694 A1    Jun. 12, 2008

(51) Int. Cl.
*A47G 29/00* (2006.01)

(52) U.S. Cl. .................... 248/371; 248/288.51; 403/90; 108/4

(58) Field of Classification Search ............... 248/124.1, 248/163.1, 371, 396, 288.31, 288.51, 178.1; 403/56, 64, 84, 85, 88, 90, 114, 115, 122–127; 108/4, 147; 473/279; 52/DIG. 10, 81.3
See application file for complete search history.

(56) References Cited

U.S. PATENT DOCUMENTS

| | | | |
|---|---|---|---|
| 1,247,385 A | | 11/1917 | Fessler |
| 1,556,725 A | * | 10/1925 | Shallcross .................... 343/869 |
| 2,195,336 A | * | 3/1940 | Loop ............................ 403/64 |
| 2,455,408 A | * | 12/1948 | Daniels ........................ 108/4 |
| 3,157,186 A | * | 11/1964 | Hammer ...................... 135/30 |
| 3,157,731 A | * | 11/1964 | Torr ........................ 174/40 R |
| 3,215,391 A | | 11/1965 | Storm |
| 3,940,771 A | | 2/1976 | Wild |
| 4,142,816 A | * | 3/1979 | Kramer ........................ 405/26 |
| 4,186,904 A | | 2/1980 | Reinmoller et al. |
| 4,360,182 A | | 11/1982 | Titus |
| 4,374,497 A | * | 2/1983 | Harmand ....................... 108/4 |
| 4,415,149 A | | 11/1983 | Rees |
| 4,733,838 A | | 3/1988 | van der Lely |
| 4,919,382 A | | 4/1990 | Forman |
| 5,251,862 A | | 10/1993 | Raymond |
| 5,340,111 A | | 8/1994 | Froelich |
| 5,528,782 A | | 6/1996 | Pfeuffer et al. |
| 5,621,933 A | | 4/1997 | Knapp et al. |
| 6,478,267 B1 | | 11/2002 | Whitman et al. |
| 6,581,892 B2 | * | 6/2003 | Carnevali ................. 248/276.1 |
| 6,640,363 B1 | | 11/2003 | Pattee et al. |
| 7,131,911 B2 | * | 11/2006 | Kim ........................... 473/279 |
| 2002/0084389 A1 | | 7/2002 | Larson |

* cited by examiner

*Primary Examiner*—Korie H. Chan

(57) ABSTRACT

The invention relates to a adjustable mounting assembly. There is a need for a simple adjustable and lockable mounting assembly. A mounting assembly adjustably supports a platform relative to a base. The assembly includes a plurality of adjustable length legs. Each leg has a first end pivotally coupled to the base and a second end pivotally coupled to the platform. An arm projects transversely away from each leg into the space surrounded by the legs. A locking or clamping device is located in the space surrounded by the legs and pivotally receives an inner end of each arm. The clamping device including a tension adjust member which can be tightened to prevent relative movement between the arms, and thus, the legs. The clamping device includes first and second plates which form a plurality of apertures therebetween. Each aperture pivotally receives a pivot ball on the inner end of each arm.

10 Claims, 3 Drawing Sheets

LOCKING MOUNTING ASSEMBLY

FIELD OF THE INVENTION

The present invention relates to a locking mounting assembly.

BACKGROUND OF THE INVENTION

Many agricultural vehicles have displays or other units which must be viewed and/or manipulated by an operator in order to monitor and control vehicle and/or implement functions. Such displays or units are typically placed in an average position convenient for most operators. Some displays or units provide dual functions. Such displays or units may need to be placed in different positions for different functions. It would be desirable to have a mounting system which allows a display or other unit to be placed in multiple positions.

SUMMARY OF THE INVENTION

Accordingly, an object of this invention is to provide a mounting system which allows a display or other unit to be placed in multiple positions.

A further object of the invention is to provide such a mounting system which eliminates the need for multiple brackets.

These and other objects are achieved by the present invention, wherein a mounting assembly adjustably supports a platform relative to a base. The assembly includes a plurality of adjustable length legs. Each leg has a first end pivotally coupled to the base and a second end pivotally coupled to the platform. An arm projects transversely away from each leg into the space surrounded by the legs. A locking or clamping device is located in the space surrounded by the legs and pivotally receives an inner end of each arm. The clamping device including a tension adjust member which can be tightened to prevent relative movement between the arms, and thus, the legs. The clamping device includes first and second plates which form a plurality of apertures therebetween. Each aperture pivotally receives a pivot ball on the inner end of each arm.

DESCRIPTION OF THE PREFERRED EMBODIMENT

Figure 1:
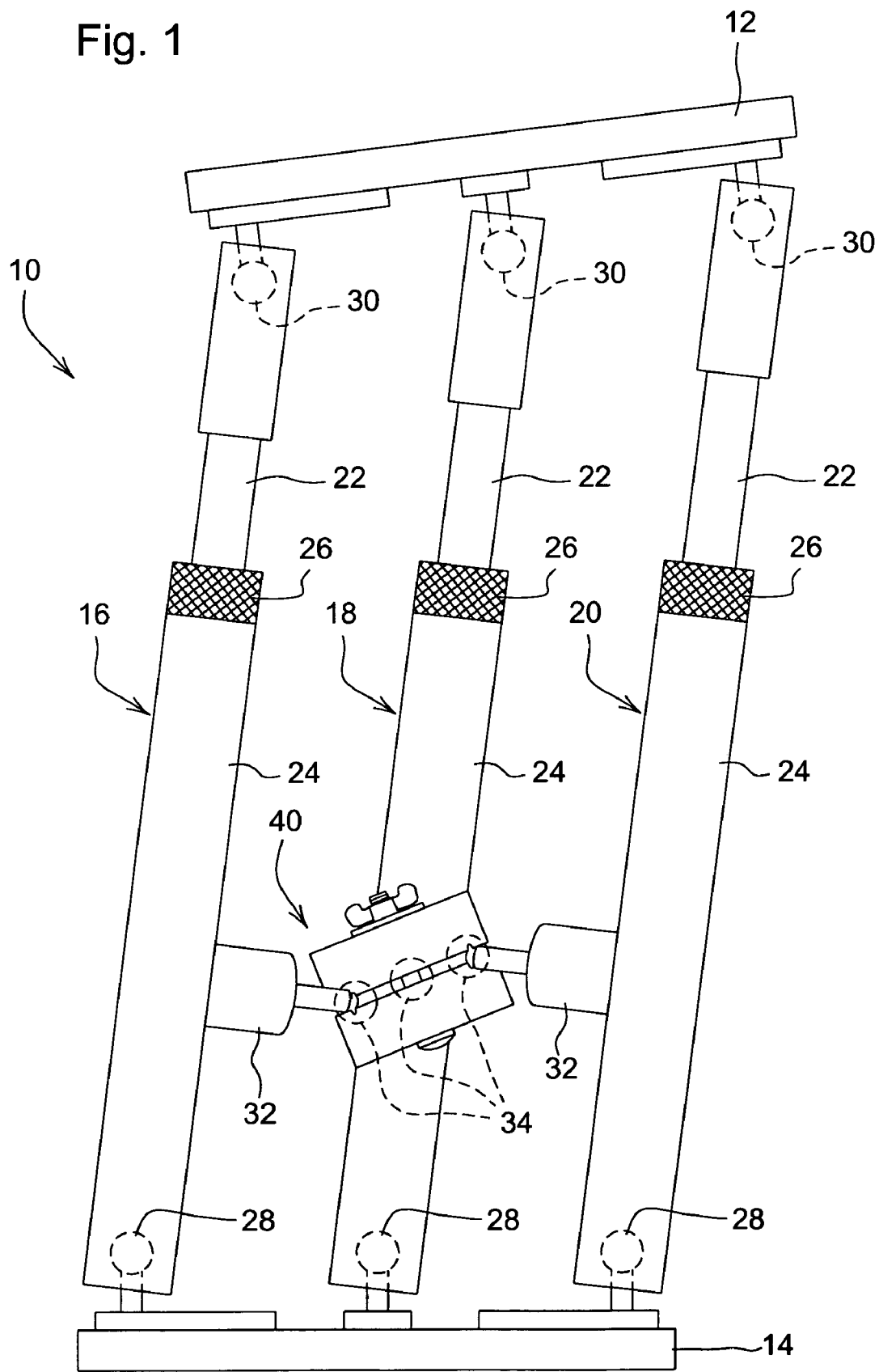
FIG. 1 is a side view of a locking mounting assembly embodying the invention in a tilted orientation.
Figure 2:
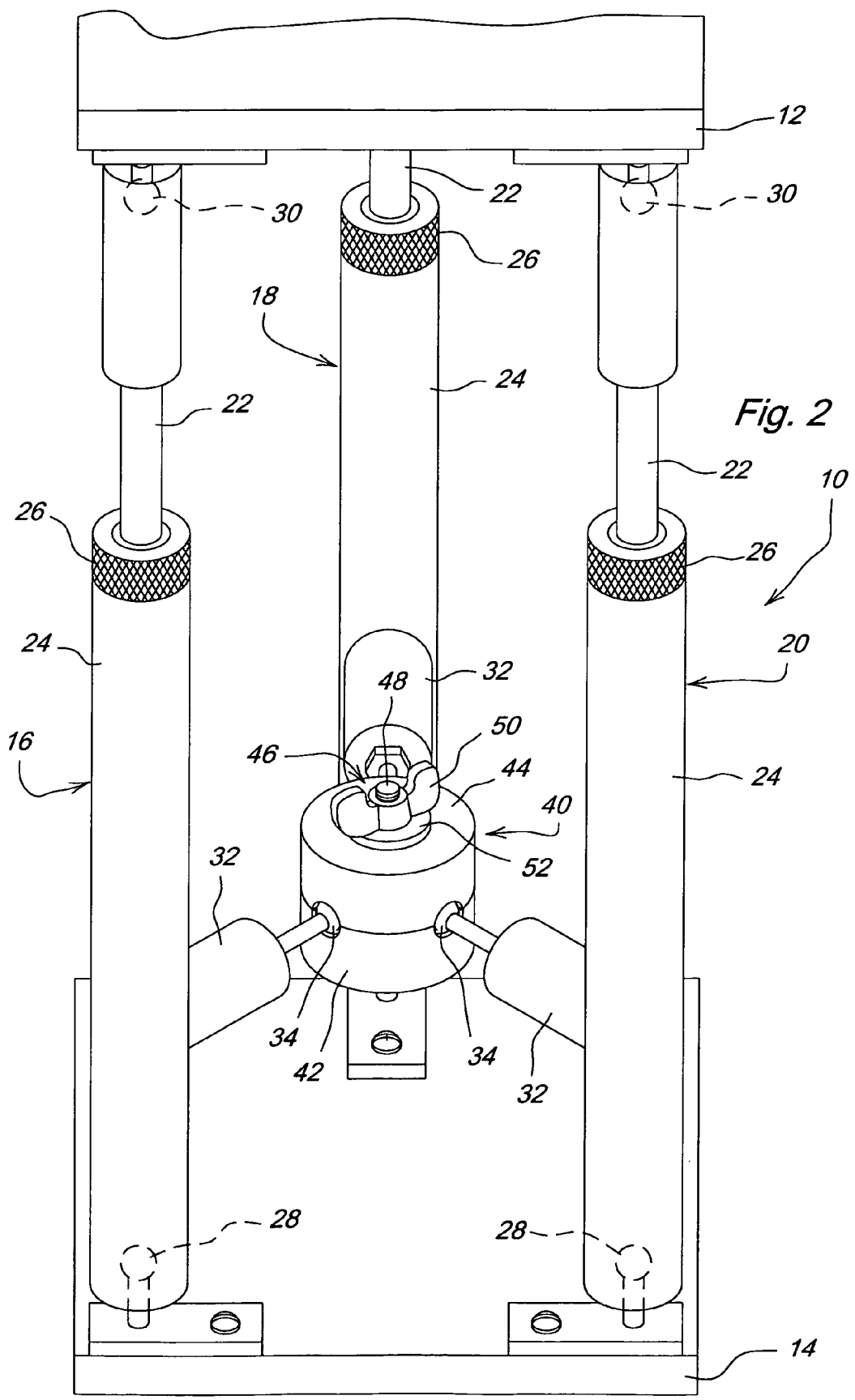
FIG. 2 is a perspective view of the locking mounting assembly of FIG. 1, in an un-tilted orientation.
Figure 3:
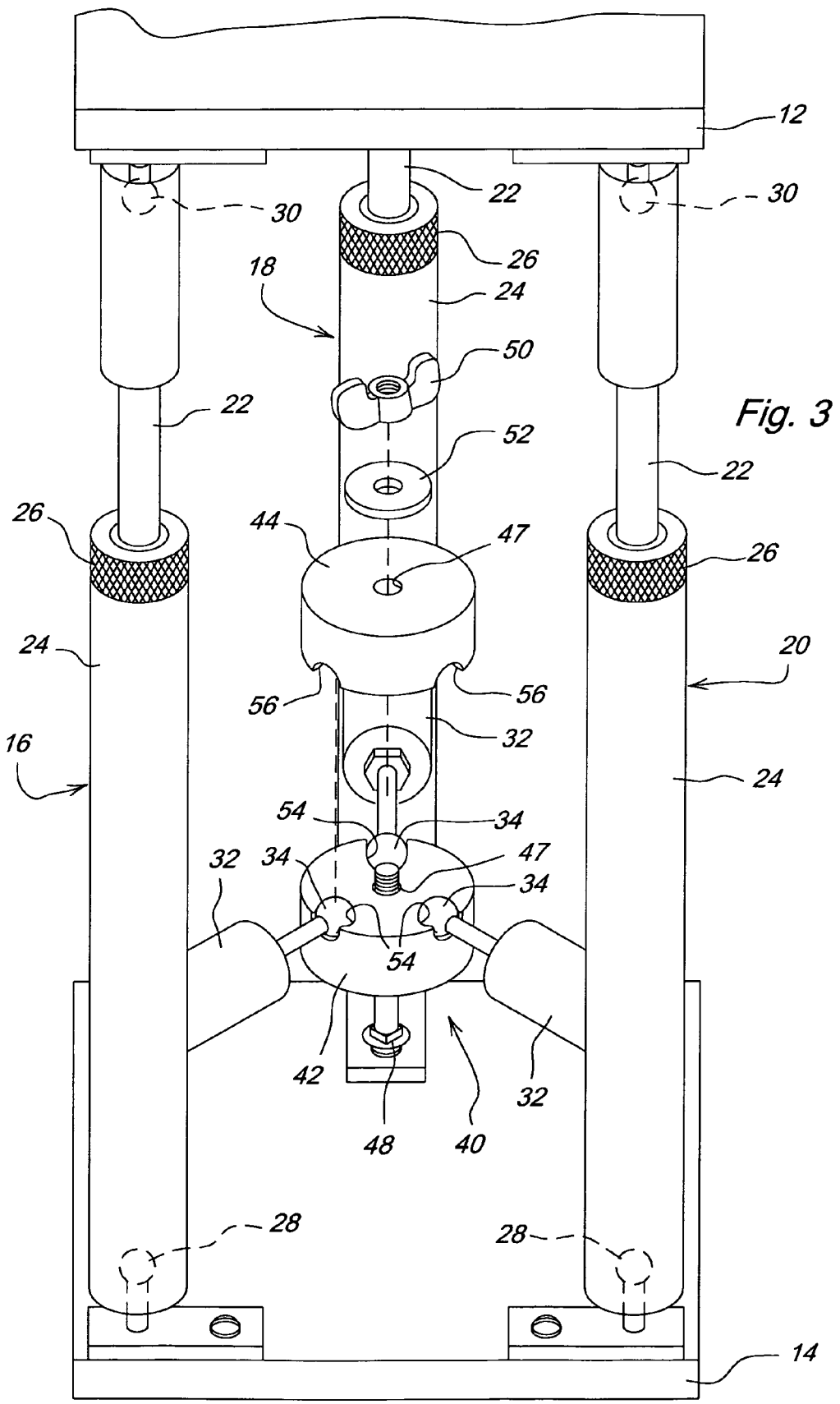
FIG. 3 is a partially exploded view of the locking mounting assembly of FIG. 2.

Referring to FIGS. 1-3, a locking mounting assembly 10 supports a platform member 12 with respect to a base 14. The locking mounting assembly 10 includes a plurality, preferably three or more, adjustable length legs 16, 18 ad 20. Each leg includes an inner rod 22, an outer sleeve 24 and a knurled locking ring 26, such as a conventional tripod leg. The inner rod 22 is slidable received by the outer sleeve 24. An end of each sleeve 24 is pivotally coupled to a coupling ball 28 mounted on the base 14. An end of each rod 22 is pivotally coupled to a coupling ball 30 mounted on the platform member 12. Each leg includes an arm 32 which projects radially from a mid-portion of the corresponding sleeve and towards the center of a space surrounded by the legs 16-20. Each arm 32 has a spherical pivot ball 34 at its inner end. The coupling balls 28 are shown in the same position relative to base 14 in all three Figures, and the coupling balls 30 are shown in the same position relative to the base 12 in all three Figures, due to the fact that coupling balls 28. 30 are fixed with respect to their respective base. Thus, each of the coupling balls 28 and 30 forms a fixed pivot point.

The assembly 10 includes a clamping or locking device 40 located in the space surrounded by the legs 16-20, and preferably in the center of that space. The locking device 40 includes a first plate 42, a second plate 44 and a tension adjust device 46 which extends through central bore 47. Tension adjust device 46 preferably comprises a bolt 48 which has a threaded end which receives a nut 50 such as a wing nut and a washer 52. Plate 42 includes a plurality of partially spherical recesses 54 and plate 44 includes a plurality of partially spherical recesses 56.

The recesses 54 and 56 are positioned at the outer edge of the inner side of their respective plates 42 and 44, and are oriented towards a corresponding one of the arms 32. When the plates are clamped together as seen in FIG. 1, each pair of adjacent recesses 54 and 56 form a partially spherical cavity which pivotally receives a corresponding pivot ball 34. The cavities are open to the exterior at the outer peripheral surface of the plates 42 and 44, so that an inner end of each arm 32 can extend therein to support balls 34. The combined dimension of the recesses 54 and 56 (in a direction parallel to the axis of bolt 48) is slightly less that the diameter of balls 34. As a result, when the bolt 48 and nut 50 are tightened to move plates 42 and 44 towards each other, the clamping pressure of the plates 42 and 44 on the balls 34 increases. This pressure can be increased to a level which prevents relative movement between the locking device 40 and the legs 16-20, thereby locking the orientation of legs 16-20 relative to each other.

The length of the legs 16-20 can be adjusted to the same or different lengths, in order to raise, lower and/or tilt platform 12 relative to base 14. If the legs are all locked at a given length, then the tilt angle of the platform 12 relative to the base 14 will remain the same as the legs are pivoted about balls 28. The angle of the legs to the base 14 can be adjusted anywhere within an inverted cone.

This locking mounting system allows adjustment in all directions which gives the operator the ability optimize the location and orientation of a display or unit for a particular purpose.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A mounting assembly comprising:
   a first base;
   second base;
   a plurality of legs, each leg having a first end pivotally coupled to the first base and a second end pivotally coupled to the second base, the legs supporting the second base relative the first base;
   a clamping device located in a space surrounded by the legs, the clamping device including a tension adjust member; and
   a plurality of arms, each arm being connected to a corresponding one of the legs and projecting away therefrom to an inner end pivotally received by the clamping device, the tension adjust member being movable to an unclamped position wherein the clamping device permits relative motion between the arms and the clamping device, and the tension adjust member being movable to a clamped position wherein the clamping device prevents relative motion between the arms and the clamping device.

2. The mounting assembly of claim 1, wherein:

each leg comprises an adjustable length leg.

3. The mounting assembly of claim 1, wherein the clamping device comprises:

a first plate and a second plate, said plates forming a plurality of apertures therebetween, the inner end of each arm being received by a corresponding one of the apertures between the plates.

4. The mounting assembly of claim 3, wherein:

the apertures are at least partially spherical, and the inner end of each arm forms a spherical ball received by the corresponding aperture.

5. The mounting assembly of claim 3, comprising:

the tension adjust member comprises a bolt and a nut threadably received on the bolt, the bolt extend through the first and second plates, the bolt having a head which engages one of the plates, and the nut engaging the other of the plates.

6. A mounting assembly comprising:

a platform;

a base;

a plurality of adjustable length legs, each leg having a first end pivotally coupled to the platform at a fixed pivot point and a second end pivotally coupled to the base at a fixed pivot point, the legs supporting the platform relative to the base;

a clamping device located in a space surrounded by the legs, the clamping device including a tension adjust member; and a plurality of arms, each arm being connected to a corresponding one of the legs and projecting away therefrom to an inner end pivotally received by the clamping device, the tension adjust member being movable to an unclamped position wherein the clamping device permits relative motion between the arms and the clamping device, and the tension adjust member being movable to a clamped position wherein the clamping device prevents relative motion between the arms and the clamping device.

7. The mounting assembly of claim 6, wherein the clamping device comprises:

a first plate and a second plate, said plates forming a plurality of apertures therebetween, the inner end of each arm being received by a corresponding one of the apertures between the plates.

8. The mounting assembly of claim 7, wherein:

the apertures are at least partially spherical, and the inner end of each arm forms a spherical ball received by the corresponding aperture.

9. The mounting assembly of claim 8, wherein:

each aperture has a dimension in a clamping direction which is smaller than a diameter of the corresponding ball.

10. The mounting assembly of claim 7, comprising:

the tension adjust member comprises a bolt and a nut threadably received on the bolt, the bolt extend through the first and second plates, the bolt having a head which engages one of the plates, and the nut engaging the other of the plates.

* * * * *